Sept. 27, 1932.                O. A. FREDERICKSON                1,880,081
                      GROUND CLAMP FOR OUTLET AND SWITCH BOXES
                      Filed Jan. 26, 1929        2 Sheets-Sheet 2
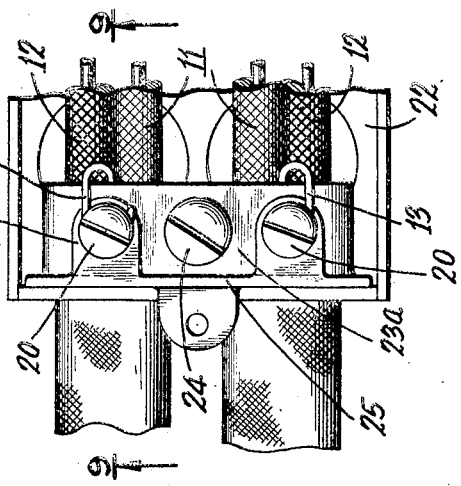
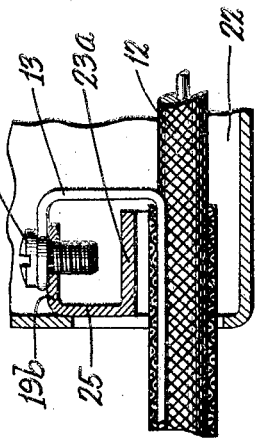
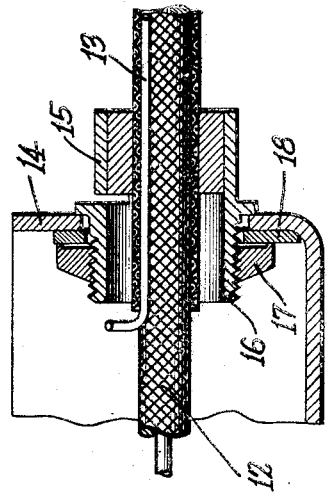
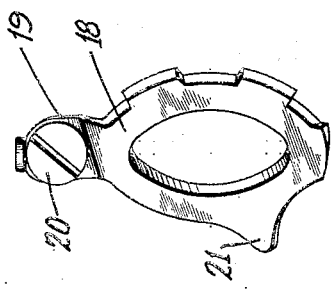

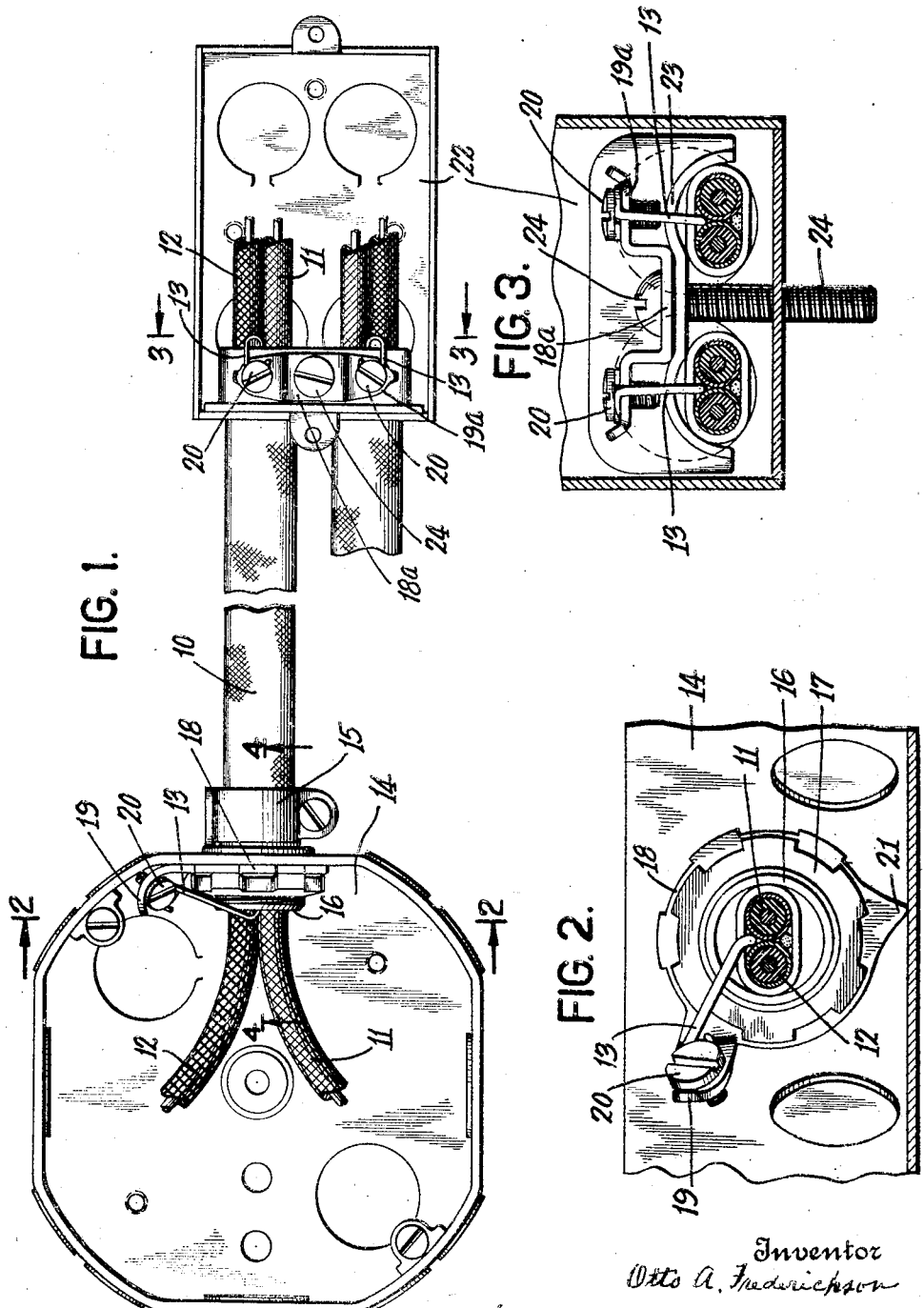

Patented Sept. 27, 1932

1,880,081

UNITED STATES PATENT OFFICE

OTTO A. FREDERICKSON, OF BEN AVON, PENNSYLVANIA, ASSIGNOR TO NATIONAL ELECTRIC PRODUCTS CORPORATION, OF NEW YORK, N. Y., A CORPORATION OF DELAWARE

GROUND CLAMP FOR OUTLET AND SWITCH BOXES

Application filed January 26, 1929. Serial No. 335,162.

At the present time the practice is growing of employing electric cables provided with an extra ground wire within the cable. This provides for the securing of the ground return with flexible non-metallic sheathed cables. Cables of this sort are shown and described in copending application Serial No. 288,421, filed June 26, 1928.

When such ground wire cables are utilized the practice is to connect such ground wires to switch boxes, outlet boxes and the like at the cable ends. The practice of connecting such ground wires heretofore has consisted, in some instances, in bending back the ground wire outside of the flexible cable and in thus establishing a connection to the outlet or switch box clamping means. This practice, while providing for a good ground, presents disadvantages in that it is difficult if not impossible, to inspect the ground circuit after the installation has been made. Another practice which has been adopted is to connect the ground wire to some suitable screw in the outlet or switch box. The screws which have been employed for securing such ground wire frequently are disposed in the outlet or switch box at comparatively remote points from the point of entrance of the cable and accordingly, there is the possibility and probability that a short circuit will be established to the ground wire from one or the other of the live conductors or of other parts which are connected to the current supplying conductors.

The present invention has for its object the provision of a securing means for a ground wire in switch or outlet boxes which will obviate the foregoing disadvantages and provide for a connection which not only may be readily inspected by an electrical inspector after the installation is complete, but also to provide for a construction in which inadvertent shorts to the ground wire from the live conductors or other live parts may be wholly prevented.

Further and other objects of the present invention will be hereinafter set forth in the accompanying specification and claims and shown in the drawings, which by way of illustration show what I now consider to be preferred embodiments of the invention.

In the drawings:

Figure 1 is a plan view of a cable outlet box, cable and switch assembly incorporating my improvements;

Fig. 2 is a detail view taken on line 2—2 of Fig. 1;

Fig. 3 is a detail sectional view taken on line 3—3 of Fig. 1;

Fig. 4 is a sectional view taken on line 4—4 of Fig. 1;

Fig. 5 shows the ground wire connector and clamping means in assembled relation;

Fig. 6 is a detail perspective view of the ground wire connector which is used with the outlet box shown to the left of Fig. 1;

Fig. 7 is a similar detail perspective view of the ground wire connector which is used with the switch box which is shown to the right in Fig. 1;

Fig. 8 is a detail view of a modified form of ground wire connector for an outlet box in which the ground wire connector is integral with the clamp which is used for clamping the flexible cables in place; and Fig. 9 is a sectional view taken on line 9—9 of Fig. 8.

In more detail, referring to Fig. 1, 10 is the flexible sheathed cable which is provided with the current carrying conductors 11 and 12 and with the ground wire 13. 14 is an outlet box of conventional type. The cable 10 is clamped in the outlet box 14 in a knockout opening by means of a nipple connector clamp generally designated 15 in Fig. 1 which comprises a threaded extension 16 (see Figs. 2 and 4) adapted to receive a nut 17 to clamp the nipple in the outlet box. To provide for a ground wire connection to the outlet box, a washer-like element 18 (see also Fig. 6) is provided which washer-like element has a laterally extending angularly turned lug portion 19 threaded to receive a binding screw 20. In assembling the nipple into the box, washer 18 is placed in position over the extension 16 and against the inside of the box 14, and the nut 17 tightened. Tightening of nut 17 clamps the plate 18 in place against the wall of the outlet box.

In order to prevent excess rotation of plate 18 during the tightening of the nut which, if permitted, might cause the connecting lug to assume an improper position, the plate 18 is provided with a lug portion 21 which is adapted to abut against the bottom of the outlet box and thus prevent excessive rotation with attendant improper positioning of the ground wire, the connecting lug and the binding screw. As shown in Fig. 1, the ground wire 13 is connected under the binding screw 20 and the position of these parts is such that inspection of the ground wire may be readily made after the installation is complete. Furthermore, the position of the lug 19 and binding screw 20 is such that inadvertent short circuits from the ground wire to the conductors 11 or 12 or to other live parts is obviated and the angularity of the lug 19 faces the binding screw toward the open side of the box and thereby facilitates connection and disconnection of the ground wire.

Referring now to the switch box which is shown on the other end of the cable 10, in Figs. 1 and 3. This switch box 22 is of conventional type including a clamping element 23 for clamping one or more of the cables 10 in position. Clamping is secured by the use of a screw such as 24. With this construction in order to provide suitable terminals for the ground wires 13, a supplementary part 18a is provided held to the clamp 23 by the screw 24 and having upturned lugs 19a to receive the binding screws 20 under which the ground wires 13 may be connected.

As shown in Fig. 1, inspection of the ground wire connections may be readily made after installation is complete and furthermore the disposition of the binding screw terminals 20 is such that inadvertent shorts are prevented.

Referring now to Figs. 8 and 9 with this construction the lugs 19b are formed integrally with the clamping member 23a. The lugs 19b extend forwardly from an upwardly extending part 25 of the clamp 23a.

What I claim is:

1. In combination, a box for an electrical distribution system having an open side and fixed walls of cable clamping means carried by one of the walls, a ground wire connecting element within and electrically joined to said box by said clamping means and having a ground wire binding screw faced toward the open side of said box, and means cooperating with a wall of the box for insuring the retention of the binding screw in such position.

2. In combination, a box for electrical distribution systems having an open side and fixed walls of cable clamping means carried by one of the walls and including a threaded extension, a clamping nut on said extension and a ground wire connecting element arranged within the box and electrically joined to said box by said clamping nut said element having a laterally extending and angularly bent terminal together with a ground wire binding screw carried by said terminal, said terminal being bent at such angle as to face the binding screw toward the open side of said box.

3. In combination, a box for electrical distribution systems having an open side and fixed walls of cable clamping means carried by one of the walls and including a threaded extension, a clamping nut on said extension and a ground wire connecting element arranged within the box and electrically joined to said box by said clamping nut said element having a laterally extending and angularly bent terminal together with a ground wire binding screw carried by said terminal, said terminal being bent at such angle as to face the binding screw toward the open side of said box, and a lateral extension on said element adapted to engage another wall of said box to insure retention of the binding screw in such position.

4. A washer for grounding a ground wire to an outlet box or other box for electrical distribution systems comprising a circular body with lateral extensions one of said extensions being bent angularly out of the plane of the washer and carrying a binding screw, and the other extension being perpendicular to the axis of the washer.

In testimony whereof I hereto affix my signature.

OTTO A. FREDERICKSON.